Jan. 10, 1950 F. DURAN 2,493,861
AIR VENT
Filed Oct. 15, 1946

Inventor
Felix Duran

By *Clarence A. O'Brien*
*and Harvey B. Jacobson*
Attorneys

Patented Jan. 10, 1950

2,493,861

UNITED STATES PATENT OFFICE 2,493,861

AIR VENT

Felix Duran, Earl, Colo.

Application October 15, 1946, Serial No. 703,297

3 Claims. (Cl. 220—44)

1

This invention relates to an air vent for shipping or storing vessels, and more particularly for milk cans.

The primary object of the invention is to provide an improved air vent by means of which the contents of the vessel may be ventilated and whereby dirt, rain and the like is effectively excluded from the vessel.

A further object of the invention is to provide the cover of a milk can with a novel air vent by means of which the contents of the can may be ventilated and dirt, rain and the like will be excluded from the interior of the can and its contents.

The exact nature of the present invention, as well as more specific objects and advantages thereof, will become apparent from the following description when considered in connection with the accompanying drawing, in which.

Figure 1:
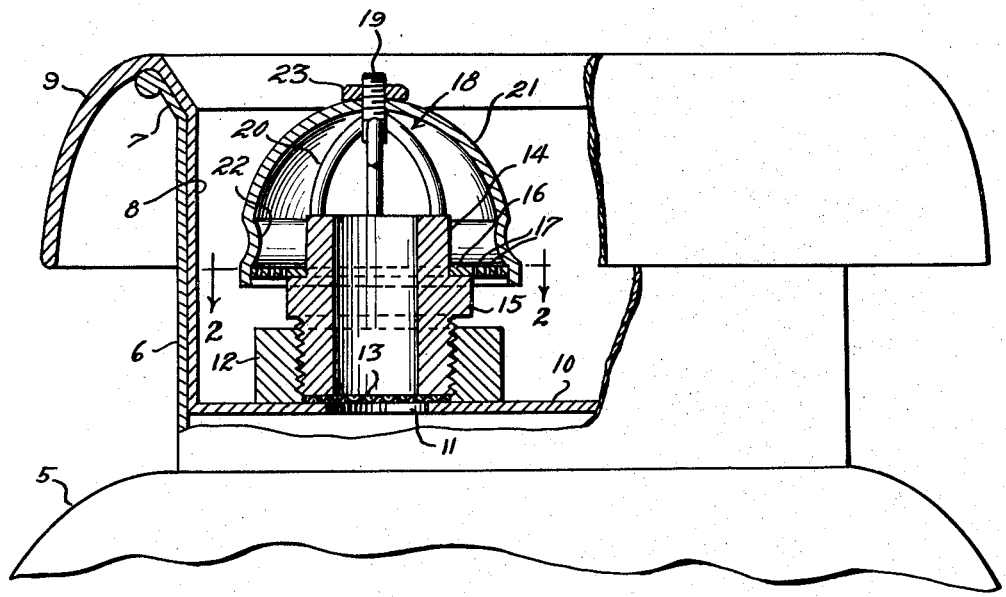
Figure 1 is a fragmentary view, partly in elevation and partly in section, showing a milk can having a cover equipped with an air vent constructed in accordance with the present invention, the air vent being in central vertical section.
Figure 2:
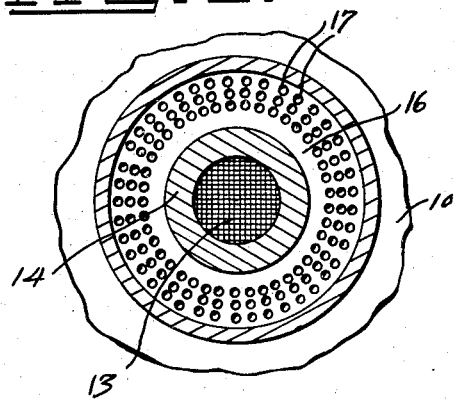
Figure 2 is a fragmentary horizontal section taken on line 2—2 of Figure 1.
Figure 3:
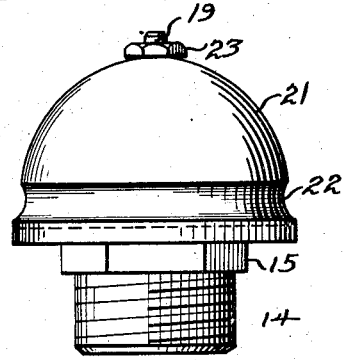
Figure 3 is an elevational view of the major portion of the air vent, per se.

Referring in detail to the drawing, 5 indicates the vessel which is shown as a milk can having a neck 6 whose upper portion 7 is flared as usual. The can is provided with a cup-shaped cover 8 which fits snugly within the neck 6 and is provided at the top with an outwardly and downwardly directed flange 9 adapted to abut against the upper edge of the flaring portion 7 of the neck 6.

In accordance with the present invention, the horizontal bottom wall 10 of the cover 8 is formed with an opening 11, and an internally threaded ring 12 is welded or otherwise secured upon the wall 10 in air-tight relation to the latter and in concentric surrounding relation to the opening 11. The opening 11 is of lesser diameter than the threaded bore of the ring 12 so that the wall 10 provides a ledge inwardly of the bore of ring 12 for supporting reception of a screen disc 13.

A nipple 14 has its lower end removably threaded into the ring 12 and upon the margin of the screen 13 to secure the latter in place, and this nipple is formed intermediate its ends with an integral nut portion 15 to facilitate screwing of the nipple into the ring 12. The nut portion 15 provides a shoulder at its upper side, and a

2 centrally apertured strainer plate 16 is disposed on the upper end portion of nipple 14 and is seated upon the shoulder provided by the nut portion 15. The strainer plate 16 is of larger size than the nut portion 15 so as to project outwardly of the latter, the projecting portion of the strainer plate being provided with numerous perforations as at 17.

A spider 18 is fixed upon the upper end of nipple 14, said spider including a vertical threaded stem 19 having curved and downwardly diverging legs 20 depending from the lower end of the stem 19 and welded or otherwise secured at their lower ends to the upper edge of the nipple 14. The spider 18 forms a support for a dome member 21 within the bottom of which the strainer disc 16 is seated, the dome 21 having pressed therein a stop bead 22 adapted to abut against the margin of strainer disc 16. Also, the dome 21 is imperforate and has a central opening which receives the stem 19, a nut 23 being screwed onto the stem 19 to secure the dome 21 in place thereon. This provides a very rigid assembly whose parts may be economically manufactured and assembled and which will be effectively retained in assembled relation.

It will be seen that fresh air may readily enter the can 5 by passing upwardly through the apertures 17 of strainer disc 16, over the upper edge of nipple 14, downwardly through the bore of nipple 14 and through screen 13 into the interior of the can. Of course, cool air may be admitted and the exit of warmer air permitted by the device, thereby insuring effective ventilation of the contents of the can 5 so that the same may remain in an unspoiled condition for a comparatively longer time without the aid of refrigeration.

From the above description, it will be seen that I have provided a very efficient and easily manufactured air vent, and one which can be readily attached to the cover of any milk can by merely forming the opening 11 in the cover and attaching the ring 12 thereto for reception of the nipple 14.

Modifications and minor changes in details of construction are contemplated, such as fall within the spirit and scope of the invention as claimed.

What I claim is:

1. The combination with a cup-shaped cover adapted to fit snugly within the neck of a milk can and including a horizontal bottom wall formed with an opening, of a nipple having its lower end attached to said bottom wall in communication with said opening, said nipple having an external shoulder intermediate its ends, a centrally apertured strainer plate fitted over the upper portion of said nipple and seated at its inner portion upon said shoulder, a spider including a vertical stem having depending downwardly diverging legs rigidly secured at their lower ends to the upper edge of the nipple, and a centrally apertured otherwise imperforate dome centrally secured on said stem and seated near its lower end on the outer portion of said strainer plate, said dome and stem being wholly disposed below the top of said cover.

2. The combination with a cup-shaped cover adapted to fit snugly within the neck of a milk can and including a horizontal bottom wall formed with an opening, of an internally threaded ring fixed upon said bottom wall in concentric surrounding relation to said opening, a nipple having its lower end threaded into said ring, said nipple having an external shoulder intermediate its ends, a centrally apertured strainer plate fitted over the upper portion of said nipple, and seated at its inner portion upon said shoulder, a spider including a vertical threaded stem having depending, downwardly diverging legs rigidly secured at their lower ends to the upper edge of the nipple, and a centrally apertured, otherwise imperforate dome removably secured on said stem and having an inwardly pressed annular bead near the bottom thereof seated on the outer portion of said strainer plate, said dome and stem being wholly disposed below the top of said cover.

3. The construction defined in claim 2, in combination with a screen disc seated at its margin on said bottom wall and within said ring, said nipple having its lower end engaged with the margin of said screen disc.

FELIX DURAN.

REFERENCES CITED

The following references are of record in the file of this patent:

UNITED STATES PATENTS

| Number | Name | Date |
|---|---|---|
| 1,320,543 | Gill | Nov. 4, 1919 |
| 1,683,338 | Evinrude | Sept. 4, 1928 |
| 1,784,067 | Holston | Dec. 9, 1930 |
| 1,921,943 | Rice et al. | Aug. 8, 1933 |
| 2,194,348 | Zoder | Mar. 19, 1940 |